(12) United States Patent
Mahoney et al.

(10) Patent No.: US 6,237,834 B1
(45) Date of Patent: May 29, 2001

(54) LINEAR FRICTION WELDED BRAKE SHOE ASSEMBLY

(75) Inventors: Murray Mahoney, Camarillo; Yngve Naerheim, Thousand Oaks, both of CA (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/513,257

(22) Filed: Feb. 24, 2000

Related U.S. Application Data

(62) Division of application No. 08/698,872, filed on Aug. 16, 1996, now abandoned.

(51) Int. Cl.$^7$ .............................. B23K 21/12; B23K 31/02
(52) U.S. Cl. ..................................... 228/112.1; 228/114.5; 29/514; 29/525.13
(58) Field of Search ............................. 228/112.1, 114.5, 228/2.1, 2.3; 29/514, 525.13; 188/2 R

(56) References Cited

U.S. PATENT DOCUMENTS

| | | | |
|---|---|---|---|
| 4,256,253 | * | 3/1981 | Nishiwaki . |
| 4,323,753 | * | 4/1982 | Boros . |
| 4,387,288 | * | 6/1983 | Boros . |
| 4,417,766 | * | 11/1983 | Smith et al. . |
| 4,444,350 | * | 4/1984 | Crummett . |
| 4,452,347 | * | 6/1984 | Dozier . |
| 5,031,288 | * | 7/1991 | Sadler et al. . |
| 5,551,623 | * | 9/1996 | Collot et al. . |
| 5,682,677 | * | 11/1997 | Mahoney . |
| 5,697,545 | * | 12/1997 | Jennings et al. . |
| 5,813,593 | * | 9/1998 | Galaske, Jr. . |
| 5,865,364 | * | 2/1999 | Trask et al. . |
| 5,957,250 | * | 9/1999 | Redgrave et al. . |

* cited by examiner

*Primary Examiner*—Patrick Ryan
*Assistant Examiner*—Colleen Cooke
(74) *Attorney, Agent, or Firm*—Carlson, Gaskey & Olds

(57) ABSTRACT

The method of this invention for assembling vehicle brake shoes includes the use of linear friction welding. Two generally planar web members having arcuate edges are precisely aligned. Each of the web members preferably includes a series of projections along an outer arcuate edge. A table member that has a curvature corresponding to the outward arcuate edge of the web members is placed in contact with the projections along the outer arcuate edge of the web members. The webs and the table are moved relative to each other, under load, to cause an increase in temperature within the metal material of the webs and the table. After the temperature is sufficiently increased, but before the material reaches its melting temperature, the relative motion is stopped and the web members are precisely aligned with the table member. Then the load is increased and the table is forced against the web members. The projections are then deformed, a flash results, and the web members are fixedly joined to the table member.

15 Claims, 2 Drawing Sheets

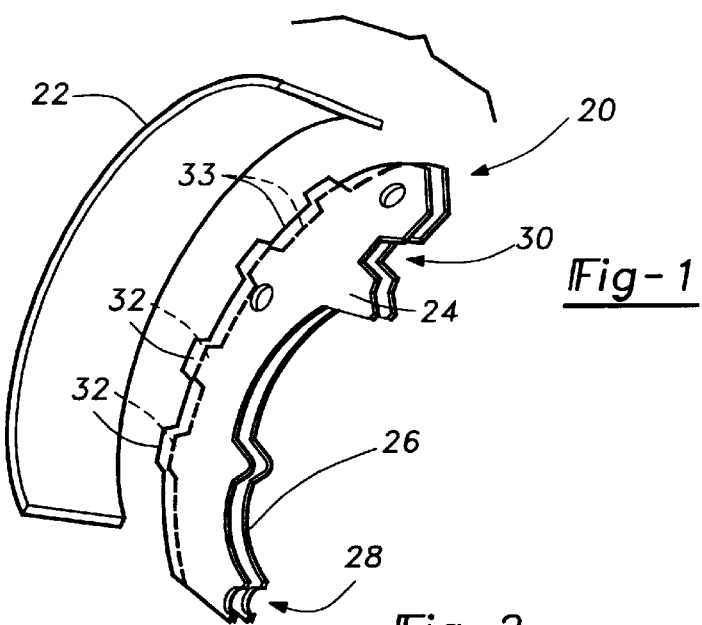
*Fig-1*
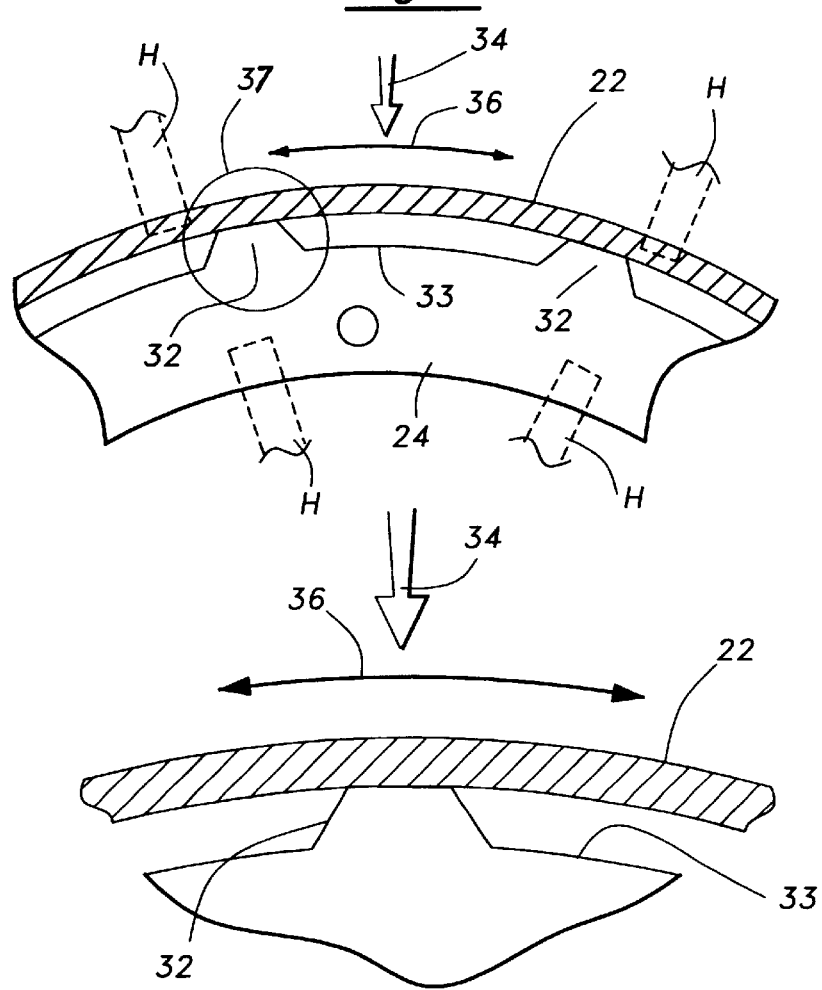
*Fig-2*
*Fig-3A*

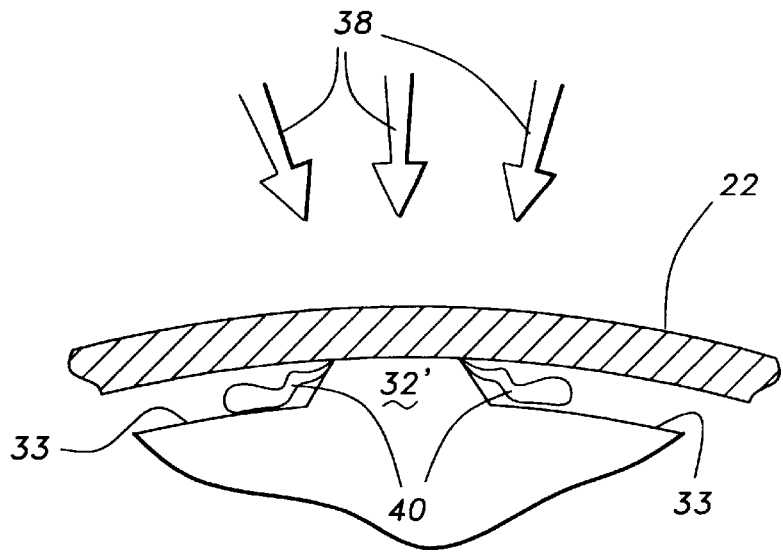
_Fig-3B_
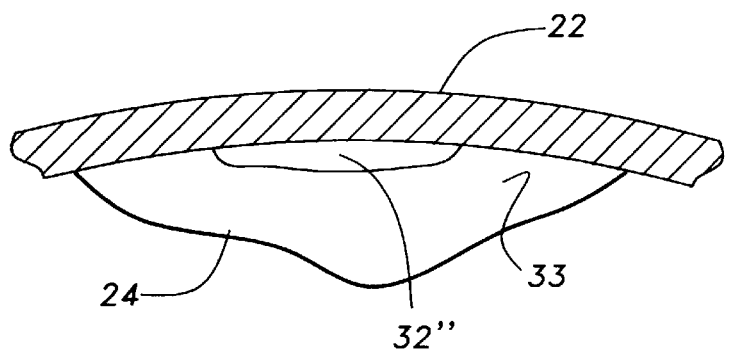
_Fig-3C_
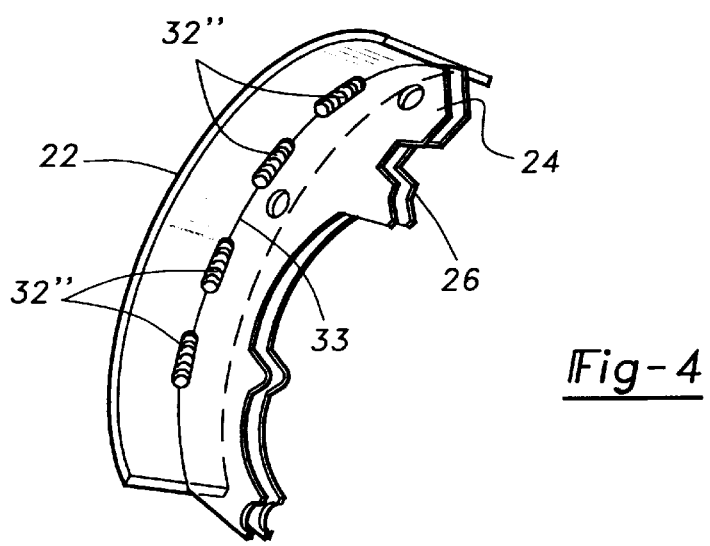
_Fig-4_

LINEAR FRICTION WELDED BRAKE SHOE ASSEMBLY

This Application is a divisional of U.S. application Ser. No. 08/698,872, which was filed on Aug. 16, 1996, now abandoned.

BACKGROUND OF THE INVENTION

This invention generally relates to vehicle brake shoe assemblies where the web members and the brake shoe table are joined by a linear friction welding process.

Modern vehicles require precisely made brake shoe assemblies. Typically, brake shoes are made with a multiple step, relatively complex and expensive process. For example, the brake shoe table is roll formed to a prescribed curvature. Two webs are then aligned and projection welded to the table. After the webs are joined to the table, appropriate slots are cut or formed in the webs to make the brake shoe workable with the remainder of a brake assembly. The slots in the webs must be heat treated to achieve a high hardness. Heat treating the webs is more difficult after they have been joined to the table. Previously, however, it was not possible to perform the hardening process before joining the webs to the table because of the requirements of providing a precisely aligned set of slots in the webs, which would be distorted during the typical process of joining the webs to the table.

There are several disadvantages and drawbacks to the usual method of assembling a brake shoe. Performing the heat treatment step after assembling the webs to the shoe as discussed above is less controlled than is desirable and adds an expensive step to the assembly process. Projection welding the webs to the table also is undesirably expensive because it requires complex, energy intensive and high maintenance machinery. It is therefore desirable to replace current brake shoe assembly process technology with a more reliable, flexible procedure.

This invention addresses the needs and shortcomings presented by conventional processes. This invention provides a more precise, less expensive and less labor intensive method of assembling brake shoes compared to the prior art. The method of this invention includes using a linear friction welding process to join the webs to the brake shoe table.

SUMMARY OF THE INVENTION

In general terms, the method associated with this invention for making a vehicle brake shoe that has two web members and a brake shoe table member is performed in four basic steps. First, two web members are aligned in a preselected alignment relative to each other. Second, the brake shoe table member is aligned with the two web members such that a portion of the brake shoe table contacts a portion of each web. The brake shoe table is held in contact with the web members and the web members are maintained in their preselected alignment while the table and the webs are moved relative to each other. This movement, while the webs are held in contact with the table, causes an increase in temperature in the contacting portions of the table and the web members. Once a sufficient temperature increase occurs, and the table member is still pressed against the web members, the web members and the table member become fixedly joined together.

In a preferred embodiment each web member has a number of projections that contact the table member at the start of the assembly process. The relative movement between the table and the web members causes the temperature of the projections to increase, but that temperature is not raised to the melting point of the metal of the web members. After a sufficient temperature increase has occurred, the table member is pressed against the web members using a force greater than the force to maintain them in alignment during the relative movement. This greater force causes the projections to be deformed in a manner that the table becomes welded to the webs at the location of each of the projections.

In the preferred embodiment, the table and the web members are generally arcuate. Each web member has a generally arcuate edge from which the projections extend outwardly. When the assembly process is complete, the brake shoe table rests against the entirety of the arcuate surface on the web members.

The various features, advantages and details of this invention will become apparent to those skilled in the art from the following detailed description of the presently preferred embodiment. The drawings that accompany the detailed description can be described as follows.

BRIEF DESCRIPTION OF THE DRAWINGS

FIG. 1 is a perspective, diagrammatic illustration of the components of a brake shoe designed according to this invention.

FIG. 2 illustrates a portion of the embodiment of FIG. 1 during the initial stages of the preferred assembly process.

FIG. 3a schematically illustrates an early stage of the preferred assembly process.

FIG. 3b schematically illustrates an intermediate portion of the preferred assembly process.

FIG. 3c schematically illustrates the final stages of the preferred assembly process.

FIG. 4 diagrammatically illustrates a completed brake shoe assembly designed and assembled according to this invention.

DETAILED DESCRIPTION OF THE PREFERRED EMBODIMENT

FIG. 1 illustrates, in perspective view, the components of a brake shoe 20. A brake shoe table 22 provides a mounting surface for a conventional brake shoe pad (not illustrated). Two web members 24 and 26 are joined to the brake shoe table 22 on an underside of the table, which is opposite from the side where the brake pad would be mounted. Each web member includes a first slot 28 and a second slot 30. The slot 28 is, for example, to engage a conventional anchor from a brake assembly. The second slot 30, for example, interacts with a cam roller in a cam actuated brake assembly. Conventionally, the first and second slots 28 and 30 were not machined into the web members 24 and 26 until after the web members are joined to the table 22. According to this invention, however, the advantageous feature of providing the first and second slots on the web members before the web members are joined to the table 22 becomes possible.

Importantly, the web members 24 and 26 each include a plurality of projections 32. As can be seen in the illustration, the web members 24 and 26 include generally flat, planar surfaces with generally arcuate edges. The projections 32 preferably project outwardly from an outward edge 33. The number of projections and the arcuate spacing of them can be varied depending upon the needs in any particular situation. In the presently preferred embodiment of this invention, however, five projections are included and they are generally equally spaced along the outward arcuate edge 33.

FIG. 2 schematically illustrates the early stages of the preferred assembly process by showing a selected portion of the embodiment of FIG. 1. The first step in the assembly process is to precisely align the web members 24 and 26. In the preferred embodiment, the web members 24 and 26 are parallel to each other with an equal spacing between opposing faces on each web along the entirety of each web. Also, the first slots 28 and the second slots 30 are respectively aligned between the two web members. The brake shoe table 22 is placed in contact with the projections 32 through appropriate machinery. The drawings show holding structures H holding both the webs and the table. The holding members are shown schematically. They preferably are able to hold the web and table against each other, and move at least one of the two. Those skilled in the art will understand how to develop machinery to carry out the steps of this invention and, therefore, it is not described in further detail in this specification.

A force arrow 34 indicates that the table 22 is forcibly maintained against the projections 32 by a force that has a direction that is generally perpendicular to the arcuate surface of the table 22 and the arcuate edge 33 of the web members. The holding structure H could accomplish this force. While the table 22 is in contact with the projections 32, either the web members 24 and 26 are moved rapidly in a generally arcuate pattern as schematically illustrated by the arrows 36 relative to the table 22, or the table 22 is moved relative to the web members 24 and 26. This movement could also be achieved by holding members H. FIGS. 3a through 3c show, in more detail, the portion of FIG. 2 encircled in the circle 38.

FIG. 3a schematically shows the initial stages of the assembly process. For simplicity, the remainder of this discussion will assume that the table 22 is moved relative to the web members 24 and 26. The web members and the table preferably are made from a metal material and, therefore, the relative movement between them under the axial load 34 causes an increase in temperature in the contacting portions. The relative motion is continued until the temperature increases sufficiently to continue the joining process, but before reaching the melting temperature of the material.

FIG. 3b illustrates that after the temperature in the contacting portions of the table 22 and the web members 24 and 26 has been sufficiently increased, the relative motion 36 is stopped. A worker in the field of linear friction welding could determine the necessary temperature to achieve before taking this step. The table 22 and the webs 24 and 26 are again precisely aligned. A second force, having the same direction as the load 34 is imposed to press the table 22 against the web members 24 and 26. Note that while load 34 appears to push the table against the webs, the reverse is also contemplated within the scope of this invention. This second force has a magnitude that is greater than the first force 34. The second force is schematically illustrated by the arrows 38. In one embodiment, the welding force 38 preferably is between 70 and 100 N/mm. Upon the greater force being imposed, a portion of the material of the projections 32 is forced outward in a form in what is known as a flash 40. The flash 40 typically has material that readily can be removed during or after assembly. When the force 38 is applied, the projections 32 are deformed. Accordingly, the projection is labelled 32' in FIG. 3b.

With continued application of the force 38, the projection 32' is further deformed to a condition 32" illustrated in FIG. 3c. After the projections 32' are sufficiently deformed to the condition illustrated as 32", the interior portion of the table 22 is resting along the arcuate surface 33 on the web members 24 and 26. Accordingly, a central portion of the inner surface of the table 22 preferably contacts the arcuate surface 33 of the web members 24 and 26. At this stage, after the metal sufficiently cools, the projections 32" have formed welded joints between the web members 24, 26 and the table 22. Importantly, the precise alignment of the webs 24 and 26 and the table is not disturbed or distorted during the welding process. All heat and deformation are essentially localized in and around the projections and the final motion provides appropriate registry of the different compounds as the soft metal hardens.

A completed brake shoe assembly is diagrammatically illustrated in FIG. 4. The assembly process just described includes a technique that is known as linear friction welding. Linear friction welding includes inducing oscillations or linear vibrations under an axial load to generate heat in the contacting portions of two metal pieces. The vibration or oscillation is then stopped and a higher load is imposed to compress the parts toward each other. Upon compression, because of the increase in temperature in the material, a welding interface is forged between the two pieces. In the preferred embodiment, the linear vibration is induced by the arcuate motion (schematically illustrated by arrow 36) in a back and forth motion at a frequency of approximately 50 Hz for a distance of approximately 3 mm in each direction.

Designing machinery for carrying out a process according to this invention is within the capabilities of those skilled in the art. Further information regarding linear welding techniques in general can be gleaned from literature as linear friction welding is a technique that has been used in the aerospace industry. Prior to this invention, however, linear friction welding has never been used to form vehicle brake shoe assemblies.

An assembly process according to this invention provides significant advantages over conventional processes. These advantages include reducing the amount of rework required after the assembly process, eliminating the requirement for hardening the web members after they have been attached to the table, eliminating welding pollutants, increasing the speed of assembly and the cost of the procedure, providing more precise alignment and utilizing energy more efficiently. Further, the assembly process according to this invention is useful with a variety of materials. Steel and aluminum alloy materials have demonstrated sufficient bonding characteristics when used in a method according to this invention. The bonding achieved when using the method of this invention is equal to or stronger than that achieved through conventional methods. The resulting weld joints or projections 32" provide a defect free, fine grain, fully recrystallized microstructure at the interface between the web members 24 and 26 and the table 22.

Although the movement is disclosed as being arcuate, it could also be linear; that is, either the table 22 or the webs 24 and 26 could be moved into and out of the plane of paper in FIG. 2 to achieve the friction.

The above description is exemplary rather than limiting in nature. Variations and modifications to the disclosed embodiment will become apparent to those skilled in the art that do not necessarily depart from the spirit of this invention. Accordingly, the legal scope granted to this invention can only be understood by studying the appended claims.

What is claimed is:

1. A method of making a vehicle brake shoe having two web members and a brake shoe table member, comprising the steps of:

(A) aligning two web members in a preselected alignment relative to each other;

(B) aligning a brake shoe table member with the two web members such that a portion of the brake shoe table member contacts a portion of each web member;

(C) causing relative movement between the brake shoe table member and the web members while maintaining contact between the contacting portions of the table member and the web members to thereby cause an increase in temperature in the contacting portions of the table member and the web members; and (D) pressing the table member against the web members such that the contacting portions are fixedly joined together.

2. The method of claim 1, wherein each web member has two generally planar faces with generally arcuate edges and wherein step (A) is performed by aligning the web members in a generally parallel alignment such that one of the faces on one of the web members is opposite from one of the faces on the other web member with a preselected amount of spacing between the opposite faces.

3. The method of claim 2, wherein the table member is a generally arcuate member having two faces and wherein step (B) is performed by placing one of the table member faces against an edge on each web member.

4. The method of claim 3, wherein step (B) is performed by centering the web member edges along the table member face such that the spacing between the web members is approximately centered on the table member.

5. The method of claim 2, wherein each web member includes a plurality of projections along an edge of the web member and wherein step (B) is performed by placing a portion of the table member against the projections on each web member.

6. The method of claim 5, wherein step (C) is performed by moving the table member in an generally arcuate motion relative to the two web members such that a temperature of the web member projections increases and wherein the contacting portion of the table member is forcibly maintained against the web member projections with a force having a first magnitude.

7. The method of claim 6, wherein step (D) is performed by forcing the table member against the web member projections using a force having a second magnitude that is greater than the first magnitude before the temperature from step (C) exceeds a predetermined temperature.

8. The method of claim 1, wherein step (C) is performed by moving the web members in a generally arcuate pattern relative to the table member.

9. The method of claim 1, wherein step (C) is performed by moving the table member in a generally arcuate pattern relative to the web members.

10. The method of claim 1, wherein step (C) is performed by maintaining the contacting portions in contact using a first force having a first magnitude and a direction and wherein step (D) is performed by the substeps of stopping the relative movement of step (C); aligning the web members and the table member in a preselected alignment; forcing the contacting portion of the table member against the contacting portions of the web members using a second force having a second magnitude that is greater than the first force magnitude; and thereafter allowing the temperature of the contacting portions to decrease.

11. The method of making a vehicle brake shoe having at least one web member and a brake shoe table member, comprising the steps of:

aligning at least one web member with a brake shoe table member such that a portion of the brake shoe table member contacts a portion of the web member;

causing relative movement between the brake shoe table member and the web member while maintaining contact between the contacting portions of the table member and the web member to thereby cause an increase in temperature in the contacting portions of the table member and the web member; and forcing the table member against the web member such that the contacting portions are fixedly joined together.

12. The method of claim 11 including utilizing a first force having a first magnitude while causing the relative movement between the brake shoe table member and the web member.

13. The method of claim 12 including using a second force having a second magnitude that is greater than the first magnitude while forcing the table member against the web member.

14. The method of claim 13, including forcing the table member against the web member using the second force before the temperature of the contacting portions exceeds a predetermined temperature.

15. The method of claim 11, including maintaining the contacting portions in contact using a first force having a first magnitude and a direction and stopping the relative movement between the brake shoe table member and the web member, aligning the web member and the table member in a preselected alignment, forcing the contacting portion of the table member against the contacting portion of the web member using a second force having a second magnitude that is greater than the first force magnitude; and thereafter allowing the temperature of the contacting portions to decrease.

* * * * *